Aug. 19, 1969     C. W. COOPER ET AL     3,462,342
ADHESIVE BONDING
Filed Jan. 18, 1965
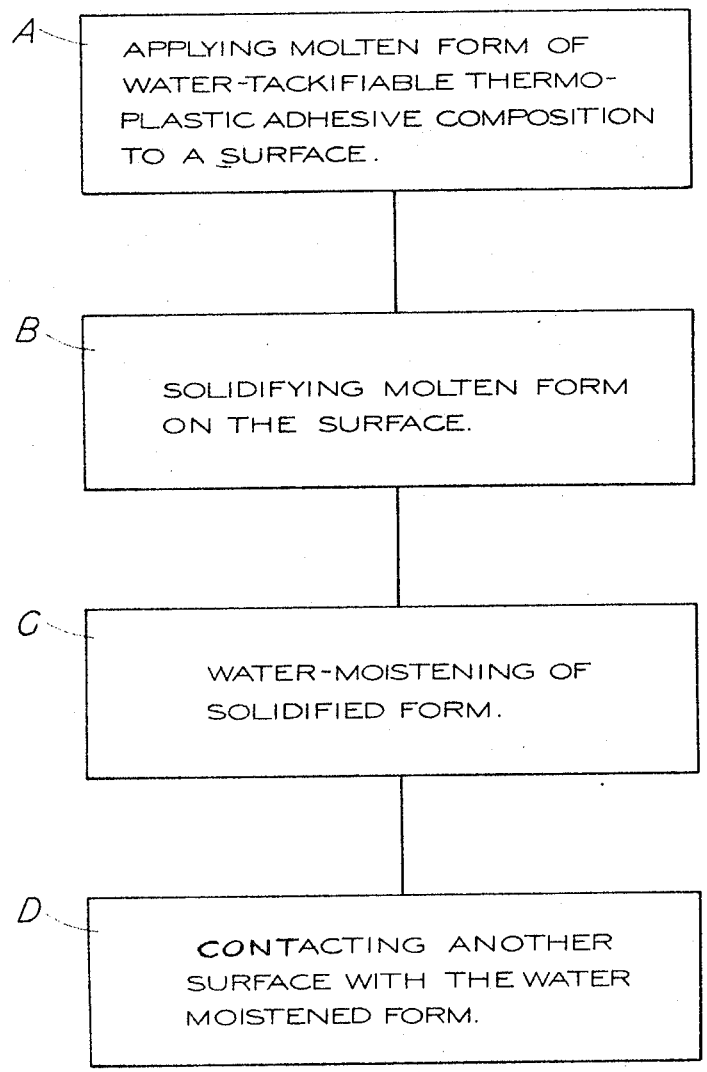
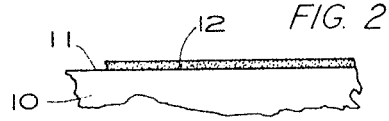
*INVENTORS*
CHARLES W. COOPER &
GERALD A. GRODE
BY GRAY MASE & DUNSON
ATTORNEYS
BY Kenneth R. Warburton 3,462,342
ADHESIVE BONDING
Charles W. Cooper and Gerald A. Grode, Columbus, Ohio, assignors, by mesne assignments, to The Battelle Development Corporation, Columbus, Ohio, a corporation of Delaware
Filed Jan. 18, 1965, Ser. No. 426,217
Int. Cl. C09j 3/04
U.S. Cl. 161—216                           6 Claims

ABSTRACT OF THE DISCLOSURE

Adhesive bonding with a hot-metal applied composition which upon cooling provides a nontacky solid form subsequently made a tacky adhesive mass merely by moistening with water.

---

This invention concerns adhesive bonding of surfaces. More particularly, this invention relates to adhesively bonding through water tackifying of a solidified thermoplastic adhesive, which earlier had been applied in its molten form and solidified on a surface, and to moistenable hot-melt appliable thermoplastic adhesive compositions and articles useful for such bonding purposes.

Numerous useful articles, for example adhesive labels, stamps, envelopes, sealing tapes, wall coverings, papers and similar objects, are known wherein a solid adhesive on a surface of the article is moistened with water to activate the solid adhesive by tackification thereof to a powerful adhesive state capable of bonding the article to another surface by contact therewith and usually also requiring application of light pressure.

Presently there are several water-moistenable adhesives known for such useful articles. Each has characteristic advantages and shortcomings. These moistenable adhesives include (1) those which are characterized by being straight dextrin, (2) an all-synthetic resin, (3) a blend of dextrin and polyvinyl acetate, and (4) a solvent dispersed dextrin which frequently is modified by other resinous components. Although the first has high gloss, good application characteristics and high-initial bond strength, it shows a strong tendency to curl and is sensitive to high humidities. The all-resin adhesives do not curl, but they have some tendency to tab or prematurely bond when normal drying cycles are used. In addition, they lack the gloss desirable from an appearance standpoint and their cost is difficult to justify since it is greater than straight dextrin. The properties and shortcomings of (3) are between those recited above for (1) and (2). It shows some tendency to curl and tab and costs somewhat more than straight dextrin. The last mentioned (4) has the obvious disadvantage of the complexities and hazards entailed in using volatile organic solvents and is more costly.

Characteristic of all the above-mentioned moistenable adhesives, is that each is applied to a surface in the form of a solution, or a dispersion, or an emulsion, or the like, in a carrier liquid and dried on the surface. Water is the least desirable solvent or dispersant in applying adhesives to cellulose or other hydrophilic surfaces because of curling. After application, the carrier liquid must be removed, as by drying with volatilization of the liquid, so as to provide a dried adhesive coating which is capable of being subsequently adhesively activated by moistening when it is desired to bond the coated surface to another surface. In such a preparation of the adhesive coating, there are limitations on the maximum amount of adhesive solids capable of being dissolved, or dispersed, or the like in the carrier liquid of the liquid composition. The applied liquid composition has to contain an amount of carrier liquid adequate to provide the necessary viscosity and other properties that permit the liquid composition to be applied as a coating on the surface. In other words, there is a definite limit on the amount of adhesive solids which can be contained in the applied liquid composition and this in turn limits the resulting amount of adhesive solids deposited as a dried solid coating.

Advantageously, adhesive solids contents of essentially 100 percent could be applied by hot-melt techniques and solidified on a surface. The economics of hot-melt application are more favorable than coating processes employing a liquid composition which necessitates drying with consequent removal of its liquid content to provide a solid moistenable adhesive coating. Principal advantages of a hot-melt applied moistenable adhesive coating are a rapid set and elimination of the drying or liquid removal step, reduced curl in paper stocks which are water sensitive, and absence of any requirement for a carrier liquid. Unfortunately, present commercially employed, water-moistenable adhesives apparently do not possess requisite thermoplastic properties permitting hot-melt application of thin smooth glossy coatings thereof. Lkewise, the present commercially employed hot-melt applied thermoplastic adhesives, after application, produce coatings having one or more shortcomings, such as inability to be readily tackified by moistening (inadequate wet tack).

Thus, it is an object of the present invention to overcome such shortcomings in the adhesive bonding art and to provide the aforedescribed advantages of moistenable hot-melt appliable thermoplastic adhesives.

A further object is to provide a bonding process wherein a molten water-moistenable adhesive is applied to a surface by hot-melt techniques, the molten adhesive is solidified to provide a solid adhesive which is nontacky at ordinary conditions, and the solidified adhesive subsequently is moistened to tackify the same when desired to adhesively bond another surface thereto.

An additional object is to provide useful water-moistenable hot-melt applicable thermoplastic adhesive compositions.

Still another object is to provide a useful article having a surface coated with a water-moistenable hot-melt applied thermoplastic adhesive composition.

All these and other objects will be apparent from the disclosure and examples which follow.

In the drawings:

FIG. 1 presents a schematic flow sheet of steps comprising the adhesive bonding process of the invention; and FIG. 2 illustrates in cross-sectional view, an article of the invention.

Broadly stated the adhesive bonding process comprises the steps of: (A) applying a molten form of a moistenable hot-melt applicable adhesive composition to a surface; (B) solidifying the applied composition to provide a solid nontacky form of the adhesive composition on the surface; (C) water moistening this solidified nontacky form of the adhesive composition to activate it to a tacky state for bonding to another surface; and (D) contacting another surface with the water-moistenable and tackified composition to adhere the other surface thereto. Moistenable hot-melt appliable adhesive compositions, which are useful for this process, will be decribed subsequently.

Broadly defined, the article comprises a substrate 10 of a material, such as cellulosic material conventionally used for packaging, having a surface 11 to which there is adhering the solidified form 12 of a molten-applied water-tackifiable thermoplastic adhesive composition.

In the process, the requisite adhesive composition is brought to a temperature at which it is a molten fluid of requisite viscosity and the like for ready application by the particular hot-melt technique being employed. This molten fluid form then is applied to a surface of a material, such as paper, boxboard, cardboard, fiberboard, wood, or other cellulosic material, fabric, textile, leather, resinous plastic film, or the like. It is applied as a thin molten film or coating to the surface, and frequently only to specific areas thereof, such as a coating for the flaps of paper envelopes, or as a bead, stripe, continuous or discontinuous as desired, onto a specific surface area for a subsequent bonding of this specific area to another surface. The applied molten fluid is then solidified, usually by cooling to a temperature at which it returns to a solid state, that is, cooled below its solidification temperature, although usually it is cooled to well below such temperature, for example to about room temperature of about 70 to 100° F. Where only a small mass of molten adhesive is applied to a colder surface of a substrate of larger mass, the molten adhesive solidifies rapidly and almost immediately. Setting times from molten to solidified form in the order of a fraction of a second are easily obtained without auxiliary cooling means in such instances. The surface having the solidified nontacky form of the adhesive composition thereon then is available for subsequent bonding to another surface by water moistening to tackify the adhesive.

Hot-melt techniques and equipment customarily used for applying coatings of molten materials are used to apply the molten fluid form of the moistenable thermoplastic adhesive composition to a surface. Developments in the last several years in this art have made hot-melt coating quite versatile. The techniques and equipment include those where the molten material is applied continuously or intermittently, as desired, through nozzles, orifices, slits, or the like, and/or by means of wheels, rolls, sprays, extruders, etc. to adherently coat surfaces of any of a wide variety of materials in a continuous or discontinuous pattern, as desired. In one such apparatus termed a "curtain coater," molten material is forced by gas pressure thereon through a discharge slot onto a surface of a moving band or web of the substrate being coated. In another, multiple roll calenders or the like apply molten material to one or more surfaces of a substrate being coated. In still another, engraved or rotogravure rolls pick up and deposit a discontinuous pattern of molten adhesive on a substrate surface. In some, an air knife, or doctor roll controls thickness of the applied molten material. In still others, the surface or surfaces being coated are dipped into or passed through a bath of the molten material. Depending on the particular hot-melt technique and equipment, a coating can be applied to one or several surfaces, in one or several passes, in a continuous or discontinuous pattern of a film, bead, stripe, dot, or the like pattern, and in thickness of less than a mil up to hundreds of mils and higher, as desired. All of these techniques and apparatuses require means to place the material in a molten form and means to apply the molten material to a surface. By placing pressure on the molten material to force it through an orifice, die, slot, or the like, molten materials of quite high viscosity, such as 25,000 centipoises and even somewhat higher, can be applied. Surface coating at operational speeds of from a few feet per minute up to 3,000 feet per minute and even higher is now possible along with a wide choice of applied coating weights. Coating weights as low as about one pound of molten adhesive per 3,000 square foot ream of paper up to and in excess of 30 pounds per ream are obtainable for adhesive bonding purposes and even higher coating deposits are obtainable when the applied coating primarily is for protective rather than adhesive purposes.

Two basic requirements for a useful moistenable hot-melt appliable adhesive composition are that (a) it be thermoplastic, and (b) in its solidified state it be activatable to a tacky adhesive by moistening with water. It is thermoplastic to an extent that at room temperature (about 70–100° F.) it is substantially a nontacky solid. At some elevated temperature, desirably above about 160° F. and below about 500° F., it proceeds to a molten liquid state of a viscosity permitting application to a surface by conventional hot-melt means. It desirably is easily maintainable in a molten state without degrading to any substantial extent, at least during that time period elapsing between placement in the molten state and application to a surface. Upon cooling from the molten state to below its solidification temperature, it solidifies to its nontacky solid state and adheres firmly to the substrate surface upon which the molten form has been applied. The solidified adhesive composition is water moistenable to an extent, that water moistening thereof activates the same to a powerful tacky adhesive mass. The created tackiness is of sufficient initial wet tack to provide adherence to another surface pressed firmly thereagainst. So long as the resolidified adhesive remains wet it retains its tackiness and it should retain this tackiness long enough to provide an adequate amount of working life for bringing another surface into contact with the water tackified adhesive mass. Upon disappearance of wetness from the tackified resolidified adhesive, either by the water evaporating, or by pick up or absorption of the water into a surface contacting the wetted adhesive, or by any other means, the then-dried adhesive adhesively bonds together those surfaces contacting the adhesive. Adhesive bond strength and permanency of the bond can be varied within wide limits through suitable selection of the particular moistenable hot-melt appliable adhesive formulation which is employed and with due consideration of the particular requirements for the ultimate adhesive application.

In general, a number of compositions fulfill this invention's requirements as useful water moistenable hot-melt appliable adhesive compositions. These adhesive compositions possess viscosities permitting application in their molten state by conventional high-speed hot-melt coating equipment to a wide variety of surfaces of various materials. They can be applied by conventional high-speed hot-melt coating equipment at temperatures not exceeding about 500° F. They cool rapidly to their solidified state and, when so cooled, result in relatively smooth glossy uniform coatings and films. The applied adhesive in its solidified state adheres strongly to both smooth and rough and porous and impervious surfaces of materials conventionally coated by hot-melt techniques. The applied resolidified adhesive in its solid state presents a smooth glossy continuous appearance and when properly applied apparently is free of pin holes therethrough. The coated surface doesn't tab, doesn't curl, is relatively flexible with little to no flaking of the adhesive coating when of a thickness of about 0.001–0.004 inch, and possesses antiblocking characteristics adequate for many applications, etc. The applied coating is readily moistened by contact with liquid water, ice, water vapor, or steam to a highly adhesive tacky mass.

The useful water-tackifiable thermoplastic adhesive compositions of this invention are formulations containing a synthetic organic resinous adhesive, which is both water-sensitive and thermoplastic, as their basic adhesive component. The useful formulations provide balanced dual properties of thermoplasticity for hot-melt application and water-tackification upon moistening of the solidified form thereof. In these formulations, the dual properties are provided in any of several ways. In some, the dual properties are provided by the synthetic organic resinous adhesive component being a copolymer based on certain monomers within particular ratios providing requisite limited molecular weight and/or viscosity. In others, the dual properties are provided in the formulations by blending therein additions of various component materials to supplement, add, increase, decrease, and otherwise provide requisite balanced properties, and thus permit a useful formulation. In still others, both of such means together provide resulting useful formulations for the purposes of this invention. Particularly useful composition formulations are those which contain a basic adhesive component based on a copolymer of vinyl methyl ether, on a polymer or copolymer of an acrylic acid, on a modified cellulose material, or on vinyl pyrrolidone-vinyl acetate copolymers. Illustrative and representative of useful water-tackifiable thermoplastic adhesive compositions are those representative formulations which follow, although other useful formulations will be apparent to those in the art from the teachings herein:

Certain water-sensitive copolymers of vinyl ethers, and in particular copolymers of vinyl methyl ether and maleic anhydride and/or maleates, are useful basic adhesive components for formulations. Generally the useful copolymers closely approximate a 50 mol percent content derived from the vinyl ether monomer and are of a low to medium viscosity grade. At room temperature they are substantially solid gums which can be moistened with water to provide good adhesive wet tack. However in a molten state, their melt-flow properties do not permit ready application of thin smooth continuous coatings. By blending sufficient amounts of hot-melt viscosity modifying materials, such as hot-melt plasticizers, with these water-sensitive vinyl methyl ether copolymers, there are obtained useful water-tackifiable hot-melt appliable thermoplastic adhesive compositions. In addition, these additives also can serve to reduce any cold tack tendencies of nonblended copolymers. These compositions then possess requisite hot-melt viscosity and other properties permitting application by conventional hot-melt techniques and equipment at high speeds in the form of a molten film which cools and solidifies rapidly to a glossy smooth solid film, which can be activated to a tacky adhesive state by water moistening but which otherwise is substantially nontacky at normal room temperatures and humidities. Useful as the hot-melt viscosity modifying materials are: polyvinyl acetate; other vinyl ether copolymers, such as polyvinyl ethyl ether copolymers and polyvinyl isobutyl ether copolymers from copolymerization of the vinyl ether monomer with such monomers as acrylonitrile, acrylates, chloroprene, vinyl chloride, vinyl esters, maleic anhydride, maleates, methacrylates, and the like; urea; glycerol esters of hydrogenated rosin; and any of numerous other like compatible thermoplastic materials which in the amount blended with the polyvinyl methyl ether copolymer provide a requisite hot-melt viscosity for ready application and retention of adequate water-sensitivity of the solidified blend for tackification upon water-moistening. In general, these useful formulations contain from about 5 to 80 percent by weight of the vinyl methyl ether-maleic anhydride copolymer and a balance substantially of hot-melt viscosity modifying material components with or without, as desired, minor amounts of conventional adhesive components, such as scenting and flavoring agents, perfumes, preservative agents, anti-blocking agents, antioxidants, colors and dyes, inert fillers, extenders, and the like. Up to about 5 percent of water may be used to facilitate blending of the vinyl methyl ether copolymer with the other constituents in the formulation. However, in the hot-melt form of the composition this water content is substantially driven off so that the applied molten composition contains little or no water. Illustrative of useful composition formulations based on vinyl methyl ether copolymers as the basic adhesive constituent are:

Formulation No. 1

Parts by weight
Polyvinyl methyl ether-maleic anhydride copolymer in which the vinyl ether content approximates about 50 mol percent and which has a reduced specific viscosity of between 0.1–0.5 in a 1 percent by weight methyl ethyl ketone solution (such as "Gantrez AN 119," General Aniline & Film Corp.) ____ 30
Urea _____ 30
Polyvinyl acetate (approximately 10,000 molecular weight) _____ 40
Water for blending purposes _____ 3.5

Formulation No. 2

Parts by weight
Polyvinyl methyl ether-maleic anhydride copolymer (same as in Formulation No. 1) _____ 30
Urea _____ 20
Polyvinyl acetate (approximately 7,500 molecular weight) _____ 20
Glycerol ester of hydrogenated wood rosin having a maximum acid number of 6, a softening point of .79–86° C., and a specific gravity of 1.06 at 25° C. (such as Stabelite ester No. 5, Hercules Powder Co.) _____ 20
Water for blending purposes _____ 3.5

Formulation No. 3

Parts by weight
Polyvinyl methyl ether-maleic anhydride copolymer (same as in Formulation No. 1) _____ 5
Polyvinyl acetate (approximately 10,000 molecular weight) _____ 80
Water for blending purposes _____ 4

Formulation No. 4

Parts by weight
Polyvinyl methyl ether-maleic anhydride copolymer (same as in Formulation No. 1) _____ 30
Urea _____ 30
Glycerol ester of hydrogenated wood rosin (same as in Formulation No. 2) _____ 30
Water for blending purposes _____ 4

Water-sensitive polymers and copolymers of polyacrylic and polymethacrylic acids are useful basic adhesive components for formulations. In particular, the lower molecular weight polymers and copolymers provide formulations of requisite viscosity for ready application and are sufficiently water-sensitive to permit tackification upon being moistened with water. Particularly useful copolymers have a molecular weight of less than 10,000 and are prepared by conventional polymerization processes from copolymerization of 20 to 60 parts by weight of acrylic acid or methacrylic acid with 60 to 20 parts by weight of vinyl acetate, vinyl methyl ether, or a like monomer. Any of several known techniques may be used to obtain polymers or copolymers of the desired molecular weight. A particularly useful technique is to employ a suitable amount of a chain stopping agent during the polymerization or copolymerization. Such chain stopping agents as tertiary dodecyl mercaptan, n-butyl mercaptan, triethylamine, methyl alcohol, and the like are useful. To provide adequate hot-melt properties in the formulations employing these water-sensitive polymers or copolymers as the useful adhesive component, there are blended therewith sufficient amounts of hot-melt plasticizers, such as: rosins; modified rosins and rosin esters; compatible thermoplastic resins, such as polyvinyl acetate, amorphous polypropylene, nylon, polyacetals, and the like; urea; synthetic waxy solids, such as polyoxyethylene monostearate, polyethylene or polyoxyethylene glycols, and the like. In general, these useful formulations contain between 10 to 75 percent by weight of a water-sensitive polymer or copolymer of a polyacrylic or polymethacrylic acid, with the balance substantially being one or more hot-melt plasticizers with or without minor amounts of other constituents used conventionally in hot-melt or water-remoistenable adhesive formulations. Illustrative useful composition formulations, based on the basic adhesive component being a water-sensitive polymer or copolymer of polyacrylic and polymethacrylic acids, follow:

Formulation No. 5

Parts by weight
- Polyacrylic acid (about 20,000 molecular weight) -- 20
- Polyvinyl acetate (less than 10,000 molecular weight) -- 60
- Polyoxyethylene monostearate of HLB No. of about 16.9 from polyoxyethylenating stearic acid with an average of about 80–85 moles of ethylene oxide for each mol of stearic acid (such as Myrj 52–5, Atlas Powder Co.) -- 20

Formulation No. 6

- Polyacrylic acid (about 15,000 molecular weight) -- 20
- Polyoxyethylene monostearate from polyoxyethylenating stearic acid with an average of about 20 mols of ethylene oxide for each mol of stearic acid (such as Brij 78, Atlas Powder Co.) -- 20
- Polyvinyl acetate (less than 10,000 molecular weight) -- 25
- N-wood rosin -- 25

Formulation No. 7

- Vinyl acetate-acrylic acid copolymer from copolymerization of about equal molar quantities of vinyl acetate and acrylic acid to a molecular weight of about 5,000 -- 50
- Polyvinyl acetate (about 7,500 molecular weight) -- 30
- Polyoxyethylene monostearate (same as in Formulation No. 5) -- 20

Formulation No. 8

- Polyacrylic acid (about 10,000 molecular weight) -- 10
- Polyvinyl acetate (less than 10,000 molecular weight) -- 60
- Polyoxyethylene monostearate (same as in Formulation No. 5) -- 20

Formulation No. 9

- Polyacrylic acid (about 15,000 molecular weight) -- 30
- Urea -- 30
- Polyvinyl acetate (about 7,500 molecular weight) -- 30

Formulation No. 10

- Polyacrylic acid (about 10,000 molecular weight) -- 20
- Polyvinyl acetate (less than 10,000 molecular weight) -- 60
- Nonylphenoxypolyethyleneoxyethanol of specific gravity of about 1.12–1.14 and containing about 85 percent ethyleneoxy units based on the weight of the nonylphenol (such as "Igepal Co-850" General Dyestuff Corp.) -- 40

Formulation No. 11

- Polyacrylic acid (about 20,000 molecular weight) -- 20
- Polyvinyl acetate (less than 10,000 molecular weight) -- 40
- Polyoxyethylene monostearate (same as in Formulation No. 5) -- 20

Formulation No. 12

- Polymethacrylic acid (about 15,000 molecular weight) -- 20
- Polyvinyl acetate (less than 10,000 molecular weight) -- 40
- Nonylphenoxypolyethyleneoxyethanol (same as in Formulation No. 10) -- 10
- Polyoxyethylene monostearate (same as in Formulation No. 5) -- 10

Formulation No. 13

Parts by weight
- Polymethacrylic acid (about 10,000 molecular weight) -- 20
- Polyvinyl acetate (less than 10,000 molecular weight) -- 20
- Waxy solid polyoxyethylene glycol (such as Polyglycol E–4000, Carbide & Carbon Chemicals Corp.) -- 20

Formulation No. 14

- Polyacrylic acid (about 15,000 molecular weight) -- 30
- Urea -- 60

Formulation No. 15

- Polyacrylic acid (about 10,000 molecular weight) -- 30
- Polyvinyl acetate (about 10,000 molecular weight) -- 30
- Urea -- 30

Formulation No. 16

- Polyacrylic acid (about 20,000 molecular weight) -- 30
- Polyvinyl acetate (about 10,000 molecular weight) -- 30
- Polyvinyl methyl ether (1 gm. of which dissolved in 100 ml. water gives an Inherent Viscosity of 0.35) -- 4.5
- Waxy solid polyethylene glycol of a spec. grav. of 1.15, freezing point of 40–45° C., flash point greater than 450° C., and a Saybolt viscosity of 100–150 sec. at 210° F. (such as "Carbowax 1540," Carbide & Carbon Chemicals Corp.) -- 5

Formulation No. 17

- Polyacrylic acid (about 15,000 molecular weight) -- 20
- Polyvinyl acetate (less than 10,000 molecular weight) -- 20
- Waxy solid polyethylene glycol approximately 600 molecular weight (such as "Carbowax 600," Carbide & Carbon Chemicals Corp.) -- 20

Formulation No. 18

- Polyacrylic acid (about 20,000 molecular weight) -- 30
- Copolymer of ethylene with vinyl acetate (about 28% vinyl acetate content) (such as Elvax 250, E.I. duPont de Nemours) -- 30

Formulation No. 19

- Polyacrylic acid (about 10,000 molecular weight) -- 30
- Amorphous polypropylene (about 10–15,000 molecular weight) -- 30

Water-sensitive modified cellulose ether materials are useful basic adhesive components for formulations. In general, these materials are water-sensitive partially methoxylated and/or ethoxylated cellulose which then usually has been polyoxyalkylenated through treatment with ethylene oxide and/or propylene oxide to provide increased water-sensitivity and water-solubility. A number of such modified cellulose materials are available commercially and are used in aqueous solution or dispersion form to apply remoistenable adhesives. In general in aqueous soltuion form, the useful modified cellulose materials in 5 percent solution in water have a viscosity between about 50 to 500 cps. (Brookfield LVF Viscometer, spindel No. 2, speed 60 r.p.m., 25° C.). In the present formulations they are employed in their solid form and are blended at elevated temperature with hot-melt plasticiding materials. In a molten form without such plasticization they are too viscous for ready application by conventional hot-melt techniques. By blending with from a few percent up to about equal parts by weight of hot-melt plasticizing material the resulting blend can be readily applied by hot-melt techniques, and upon solidification the solidified form permits activation to a tacky adhesive state by water-moistening. Useful hot-melt plasticizing materials for blending with these water-sensitive cellulose ether materials include: urea; N-ethyl paratoluene sulfonamide; compatible synthetic hot-melt plasticizers, as aforementioned; and numerous other thermoplastic materials which function as plasticizers to lower the hot-melt viscosity of such water-sensitive modified cellulose ether materials. Illustrative of useful composition formulations, based on the basic adhesive component being a water-sensitive modified cellulose ether material, follow:

Formulation No. 20

Parts by weight

Partially methoxylated cellulose after polyoxyethylenation with ethylene oxide in an amount to impart a viscosity of 75–150 cps. for a 5 percent aqueous solution thereof, as determined by Brookfield LVF Viscometer, spindel No. 2 speed 60 r.p.m., 25° C. (such as "Klucel L," Hercules Powder Co.) _____ 70
Waxy solid polyethylene glycol of an approximate molecular weight of 20,000 (such as Carbowax (20 m), Carbide Carbon Chemicals Co.) _____ 30

Formulation No. 21

Parts by weight

Partially methoxylated cellulose after polyoxyethylenation to impart water solubiilty (same as in Formulation No. 20) _____ 70
Glycerol ester of hydrogenated wood rosin (same as in Formulation No. 2) _____ 30

Formulation No. 22

Parts by weight

Partially methoxylated cellulose after polyoxyethylenation to impart water solubility (same as in Formulation No. 20) _____ 70
N-ethyl para-toluene sulfonamide (such as "Santicizer '3'," Monsanto Chemical Company) _____ 30

Formulation No. 23

Parts by weight

Partially methoxylated cellulose after polyoxyethylenation with ethylene oxide in an amount to impart water solubility and to provide a viscosity of 150–400 cps. for a 5 percent aqueous solution thereof, as determined by Brookfield LVE Viscometer, spindel No. 2, speed 60 r.p.m., 25° C. (such as "Klucel G," Hercules Powder Co.) _____ 70
Urea _____ 30

Water-sensitive copolymers of vinyl pyrrolidone with vinyl acetate are useful basic adhesive components for formulations. The useful water-sensitive vinyl pyrrolidone-vinyl acetate copolymers are those wherein the weight ratio of the vinyl pyrrolidone moiety to vinyl acetate moiety is between about 10:90 to 40:60 and wherein the copolymer's molecular weight is relatively low. The molecular weight of these copolymers should be low enough to give a value of less than about 4,000 meter grams torque on a Brabender Plastic-corder at 200° C. and 150 r.p.m. Any of several known techniques may be used to obtain copolymers of the desired molecular weight and requisite vinyl pyrrolidone-vinyl acetate ratio. A particularly useful technique copolymerizes the requisite ratio of monomers in the presence of small quantities (about 1 to 10 parts per hundred parts of monomers) of a chain stopping agent to regulate the copolymer's molecular weight. Suitable chain stopping agents include: tertiary dodecyl mercaptan, n-butyl mercaptan, triethyl amine, methyl alcohol, carbon tetrachloride, and the like. Copolymers of low-mat viscosity may be used directly without other constituents as a useful formulation. With copolymers of the requisite molecular weight and somewhat higher melt viscosity, there are blended therewith in the molten state sufficient amounts of polyglycol ethers or esters to provide useful formulations of suitable melt viscosity for hot-melt application. Illustrative of these useful polyglycol ether or ester components are: triacetyl ethylene glycol, polyoxyethelene, glycerine, and the like. Illustrative of useful formulations based on water-sensitive copolymers of vinyl pyrrolidone and vinyl acetate as the basic adhesive component are:

Formulation No. 25

Parts by weight

Vinyl acetate-vinyl pyrrolidone copolymer from copolymerization of 10 percent by weight of vinyl pyrrolidone with 90 percent by weight of vinyl acetate in the presence of tertiary dodecyl mercaptan as a chain-stopping agent in an amount to provide the copolymer measuring 80 meter grams torque on a Brabender Pa Plastic-corder at 200° C. and 150 r.p.m. _____ 100

Formulation No. 26

Parts by weight

Vinyl acetate-vinyl pyrrolidone copolymer from copolymerization of a 40:60 ratio of vinyl pyrrolidone and vinyl acetate in the presence of a chain-stopping agent to provide the copolymer measuring 200 meter grams torque on a Brabender Plastic-corder at 200° C. and 150 r.p.m. _____ 100

Formulation No. 27

Parts by weight

Vinyl acetate-vinyl pyrrolidone copolymer (same as in Formulation No. 26) _____ 90
Polyglycol ether, of an approximate molecular weight of 600 (such as Carbowax 600, Carbide Chemicals Corporation) _____ 10

Each of the preceding formulations, based on any of the several, already mentioned, basic synthetic organic resin adhesive components, can contain in addition to the basic constituent, not only various other constituents already mentioned as useful therewith, but also minor amounts of numerous other constituents generally used in conventional adhesive formulations. Such other useful constituents include: scenting and flavoring agents; perfumes; antioxidants for the basic synthetic organic resin adhesive component; coloring agents; antiblocking agents; inert filler and extender materials, such as clays, bentonites, and other siliceous products, wood flour, and the like.

Method Examples 1–27

Each of the preceding composition formulations, Nos. 1 through 27, respectively, was heated to a molten state and in the molten state spread by a knife blade as a thin film of desired thickness on a sheet of paper. The paper weighing about 36 pounds per 24″ x 36″ ream. The hot melts were applied at temperatures between 150° F. to 350° F. depending on the particular formulation being employed. Applied coating weights of the respective hot melt were such as to provide relatively uniform, smooth, adherent paper coatings of thicknesses which could be varied, as desired, from about ½ to 5 mils in thickness. The respective hot melts solidified rapidly, within less than ½ minute, after being spread onto the surface of the paper and adhered firmly to the paper. The resulting solidified compositions on the paper sheets were substantially tack free at temperatures between 70° to 100° F. and a relative humidity of 40–60 percent over periods in excess of several days. When a thin film of water was spread on the solidified coatings, as by passing a wetted finger or wetted roll thereover, the moistened coatings within a few seconds became tacky and adhesive. When a second sheet of uncoated like paper was placed in firm contact with the water-moistened coating, it clung thereto and within minutes adhered thereto quite strongly. After permitting the joined papers to stand for 1 hour, the adhesive bond was such that the papers could not be torn apart without paper fragments or fibers being torn from one or both of the adhered paper surfaces.

Method Examples 28–70

Each of composition Formulations Nos. 3, 5, 7, 20, 22, 25, and 27 was employed to apply from a hot melt several 1 to 5-mil coatings as described in the preceding example. Coatings were applied to the following materials:

(a) Kraft paper.
(b) Kiln-dried white pine.
(c) Linen.
(d) Cotton percale.
(e) Paper-board.
(f) Canvas.
(g) Aluminum foil, 1 mil thick.

The solidified coatings were allowed to stand overnight. They were then moistened with a wet roller and within less than 5 seconds after moistening were placed in firm contact with uncoated material. These joined materials were held together under about 0.1 lb./sq. in. pressure for about 10 minutes. At this time adhesive bond strengths were measured in accordance with ASTM Test Procedures D903–49 or D1876–61T. The D903–49 method refers to a procedure for rigid materials which must be tested in a straight line or 180-degree pull. The values obtained are reported in the following Table I.

TABLE 1

| Example No. | Formulation No. | Materials | Hot melt applied adhesive surface | ASTM test method | Bond strength, lb./in. | Type of failure |
|---|---|---|---|---|---|---|
| 28 | 3 | Cotton percale to cotton percale | Cotton | D1876–61T | 0.3 | Adhesive failure. |
| 29 | 3 | Cotton percale to kraft paper | Kraft paper | D1876–61T | 0.7 | Do. |
| 30 | 3 | Cotton percale to wood | Wood | D903–49 | 0.7 | Do. |
| 31 | 5 | Cotton percale to cotton percale | Cotton | D1876–61T | 0.7 | Adhesive failure. |
| 32 | 5 | Kraft paper to kraft paper | Both surfaces | D1876–61T | 0.08 | Do. |
| 33 | 7 | ...do | Paper | D1876–61T | 0.9 | Fiber failure. |
| 34 | 7 | Canvas to canvas | Canvas | D1876–61T | 0.2 | Adhesive failure. |
| 35 | 7 | Canvas to wood | Wood | D903–49 | 0.1 | Do. |
| 36 | 20 | Kraft paper to kraft paper | Paper | D1876–61T | 1 | Fiber failure. |
| 37 | 20 | ...do | ...do | D1876–61T | 1.3 | Do. |
| 38 | 20 | ...do | ...do | D1876–61T | 1.1 | Do. |
| 39 | 20 | ...do | ...do | D1876–61T | 1.3 | Do. |
| 40 | 20 | Aluminum foil to aluminum foil | Aluminum | D1876–61T | 0.2 | Adhesive failure. |
| 41 | 20 | Paperboard to paperboard | Paperboard (smooth side) | D1876–61T | 0.2 | Do. |
| 42 | 20 | Kraft paper to paperboard | Paperboard (rough side) | D1876–61T | 2 | Fiber failure. |
| 43 | 20 | Kraft paper to wood | Wood | D903–49 | 2.3 | Fiber failure of paper. |
| 44 | 20 | ...do | ...do | D903–49 | 2.4 | Do. |
| 45 | 22 | Aluminum to aluminum | Aluminum | D1876–61T | 0.6 | Adhesive failure. |
| 46 | 22 | Paperboard to paperboard | Paperboard (rough side) | D1876–61T | 5.3 | Fiber failure. |
| 47 | 22 | Kraft paper to wood | Wood | D903–49 | 2.9 | Fiber failure of paper. |
| 48 | 22 | ...do | ...do | D903–49 | 2.7 | Do. |
| 49 | 22 | ...do | ...do | D903–49 | 2.4 | Do. |
| 50 | 22 | Kraft paper to kraft paper | Paper | D1876–61T | 1.2 | Do. |
| 51 | 22 | ...do | ...do | D1876–61T | 1.4 | Do. |
| 52 | 22 | ...do | ...do | D1876–61T | 1.2 | Do. |
| 53 | 22 | ...do | ...do | D1876–61T | 1.1 | Do. |
| 54 | 25 | Canvas to wood | Wood | D903–49 | 1 | Adhesive failure. |
| 55 | 25 | Aluminum to aluminum | Aluminum | D1876–61T | 0.4 | Do. |
| 56 | 25 | Aluminum to cotton percale | ...do | D1876–61T | 0.7 | Do. |
| 57 | 25 | Cotton percale to cotton percale | Cotton percale | D1876–61T | 0.6 | Do. |
| 58 | 27 | Canvas to wood | Wood | D903–49 | 12.8 | Fiber failure. |
| 59 | 27 | Kraft paper to kraft paper | Kraft paper | D1876–61T | 0.6 | Do. |
| 60 | 27 | ...do | ...do | D1876–61T | 0.8 | Do. |
| 61 | 27 | Canvas to canvas | Canvas | D1876–61T | 5 | Do. |
| 62 | 27 | ...do | ...do | D1876–61T | 5.1 | Do. |
| 63 | 27 | Linen to linen | Linen | D1876–61T | 2.8 | Do. |
| 64 | 27 | ...do | ...do | D1876–61T | 3.8 | Do. |
| 65 | 27 | Cotton percale to cotton percale | Cotton percale | D1876–61T | 7.9 | Do. |
| 66 | 27 | ...do | ...do | D1876–61T | 7.1 | Do. |
| 67 | 27 | ...do | ...do | D1876–61T | 8.8 | Do. |
| 68 | 27 | ...do | ...do | D1876–61T | 7.4 | Do. |
| 69 | 27 | Linen to aluminum foil | Linen | D1876–61T | 0.1 | Adhesive failure. |
| 70 | 27 | ...do | Aluminum | D1876–61T | 3.1 | Fiber failure. |

Variations may be made in materials, proportions and procedures without departing from the true spirit and scope of the invention, which is limited only by the following claims.

What is claimed is:

1. A hot-melt appliable, water-moistenable thermoplastic adhesive composition
(A) characterized by:
(1) being hot-melt appliable at an elevated temperature between 150° and 500° F. whereat it is in a molten fluid form having a melt viscosity below 25,000 cps. and low enough to be applied by a hot-melt application means;
(2) providing a nontacky solid form thereof after cooling from its hot-melt application to a temperature of about 70° to 100° F.; and
(3) subsequently becoming a tacky adhesive mass merely by moistening the nontacky solid form with water at said temperature;
and
(B) consisting essentially of:
(1) a synthetic organic resinous adhesive; and
(2) a hot-melt plasticizing material therefore blended therewith; with said synthetic organic resinous adhesive selected from the group consisting of
(a) a water-sensitive vinyl methyl ether/maleic anhydride copolymer of a low to medium viscosity grade and having about a 50 mol percent content thereof derived from vinyl methyl ether monomer, with this copolymer, when selected, present in an amount between 5 and 80 percent by weight of said adhesive composition,
(b) a water-sensitive, lower molecular weight polyacrylic material selected from the group consisting of water-sensitive polyacrylic acid polymers, water-sensitive polymethacrylic polymers, water-sensitive copolymers of a molecular weight of less than 10,000 from copolymerization of 20 to 60 parts by weight of acrylic acid with 60 to 20 parts by weight of vinyl monomer, and water-sensitive copolymers of a molecular weight of less than 10,000 from copolymerization of from 20 to 60 parts by weight of polymethacrylic acid with 60 to 20 parts by weight of vinyl monomer, with this polyacrylic material, when selected, present in an amount between 10 and 75 percent by weight of said adhesive composition,
(c) a water-sensitive modified cellulose ether material selected from the group of polyoxyalkylenated water-sensitive partially methoxylated cellulose and polyoxyalkylenated water-sensitive partially ethoxylated cellulose, having a viscosity between about 50 to 500 cps. in 5 percent water solution, with this cellulose ether material, when selected, present in an amount greater than 50 percent by weight of said adhesive composition, and (d) a water-sensitive vinyl pyrrolidone/vinyl acetate copolymer having a weight ratio of its vinyl pyrrolidone moiety to its vinyl acetate moiety between about 10:90 and 40:60 and having a molecular weight providing a value of less than about 4000 meter grams torque on a Brabender Plastic-corder at 200° C. and 150° C., with this copolymer, when selected, present in an amount of 100 percent by weight of said adhesive composition when of a low-melt viscosity and present in a lesser amount when of a high melt viscosity.

and with said hot-melt plasticizing material present in an amount constituting substantially the balance of said adhesive composition.

2. The hot-melt appliable, water-moistenable thermoplastic adhesive composition of claim 1 containing said water-sensitive vinyl methyl ether/maleic anhydride copolymer as said synthetic organic resinous adhesive constituent, and containing blended therewith the hot-melt plasticizing material of polyvinyl acetate, a glycerol ester of hydrogenated rosin, or another vinyl ether copolymer.

3. An article comprised of:
(A) a surface consisting of paper, boxboard, fiberboard, wood, other cellulosic material, fabric, textile, leather, metal foil, or resinous plastic film; and
(B) thereon and adhering thereto, the nontacky solid form of the adhesive composition of claim 1 provided thereat from cooling to a temperature of about 70° to 100° F. a hot-melt application of the molten fluid form of the adhesive compositon of claim 1.

4. The article of claim 3 in which said nontacky solid form, on and adhering to said surface, is between 1 and 5 mils thick.

5. The article of claim 4 in which the surface is paper.

6. In the method of adhesively joining together of surfaces consisting of paper, boxboard, fiberboard, wood. other cellulosic material, fabric, textile, leather, metal foil, or resinous plastic film through contacting a solid adhesive therebetween which is tackified merely by moistening with water just prior to said contacting, the improvement of: employing the nontacky solid form of the adhesive composition of claim 1 for said solid adhesive which is tackified merely by moistening with water.

References Cited

UNITED STATES PATENTS

| | | | |
|---|---|---|---|
| 2,099,320 | 11/1937 | Stelkens | 156—307 X |
| 2,269,125 | 1/1942 | Quenelle et al. | 156—307 |
| 2,399,338 | 4/1946 | Ford | 156—307 X |
| 3,073,736 | 1/1963 | Lange | 156—307 |

OTHER REFERENCES

The Chemistry of Commercial Plastics, Wakeman, Reinhold Publishing Corp., New York, 1947, page 367.

Skeist, Irving, Handbook of Adhesives, Reinhold Publishing Corp., New York, 1962, pp. 376, 405–407, 574. 405–407, 574.

EARL M. BERGERT, Primary Examiner

C. B. COSBY, Assistant Examiner

U.S. Cl. X.R.

156—307, 314, 332; 161—226, 249, 268; 260—13, 31.8, 874, 895

PO-1050
(5/69)

UNITED STATES PATENT OFFICE
CERTIFICATE OF CORRECTION

Patent No. 3,462,342                Dated August 19, 1969

Inventor(s) C. W. Cooper et al

It is certified that error appears in the above-identified patent and that said Letters Patent are hereby corrected as shown below:

Column 9, line 69, "low-mat" should read --low melt--.
Column 10, line 52, following "paper", second occurrence thereof, add --employed was white bond paper--.

SIGNED AND
SEALED
DEC 23 1969

(SEAL)
Attest:

Edward M. Fletcher, Jr.
Attesting Officer

WILLIAM E. SCHUYLER, JR.
Commissioner of Patents